United States Patent [19]

Chang

[11] Patent Number: 5,160,182
[45] Date of Patent: Nov. 3, 1992

[54] MULTI-FUNCTION CHAIR

[76] Inventor: Chien I. Chang, No. 38, Bao-Chung 3rd St., Chia-Yi City, Taiwan

[21] Appl. No.: 821,442

[22] Filed: Jan. 16, 1992

[51] Int. Cl.⁵ .............................................. A47C 13/00
[52] U.S. Cl. ..................................... 297/129; 280/30; 280/47.18
[58] Field of Search ..................... 297/17, 29, 53, 129; 280/30, 47.18

[56] References Cited

U.S. PATENT DOCUMENTS

| | | | |
|---|---|---|---|
| 3,381,998 | 5/1968 | Cheshier et al. | 297/53 X |
| 3,885,828 | 5/1975 | Shepard | 297/53 X |
| 3,997,213 | 12/1976 | Smith et al. | 297/129 X |
| 4,290,625 | 9/1981 | Barriere | 297/129 X |
| 4,733,905 | 3/1988 | Buickerood et al. | 297/129 |
| 4,824,167 | 4/1989 | King | 297/129 |
| 5,062,650 | 11/1991 | Chang | 297/129 |

FOREIGN PATENT DOCUMENTS 109681 7/1925 Switzerland ......................... 297/53

Primary Examiner—Peter R. Brown
Attorney, Agent, or Firm—Jacobson, Price, Holman & Stern

[57] ABSTRACT

A multi-function chair comprising a fore leg frame and a hind leg frame combined movably intercrossing each other to stand on the ground as a chair or to be folded in a straight line as a light duty truck with casters to stand and move on the ground.

3 Claims, 3 Drawing Sheets

MULTI-FUNCTION CHAIR

BACKGROUND OF THE INVENTION

This inventor has a multi-function chair of a U.S. Pat. No. 5,062,650, which can be adapted to be used as a chair or a light duty truck.

SUMMARY OF THE INVENTION

The object of this invention is to provide another kind of multi-function chair also having a structure to be adapted to be used as a chair or a light duty truck.

This multi-function chair in the present invention, comprises a seat, a back frame, a seat frame, a fore leg frame and a hind leg frame as its main components.

The fore leg frame and the hind leg frame are combined together to movably intercross each other. The top end of the fore leg frame engages engaging means in the bottom of the seat to stand securely on the ground, forming this invention into a chair.

If the back frame and the rear end of the seat is lifted up. letting the top end of the fore leg frame separate from the engaging means in the seat, moving the hind leg frame so as to force pins in L-shaped slots in joints move from the bending corners to the bottoms of the slots, folding the fore leg frame and the hind leg frame in a straight line, turnning them together to the front of the seat, and then letting a lateral connecting rod in the fore leg frame engage lower openings in projecting-down walls of the seat, then this multifunction chair is transformed into a light duty truck.

BRIEF DESCRIPTION OF THE DRAWINGS

This invention will now be described in detail with reference to accompanying drawings wherein.

DETAILED DESCRIPTION OF THE INVENTION

Figure 1:
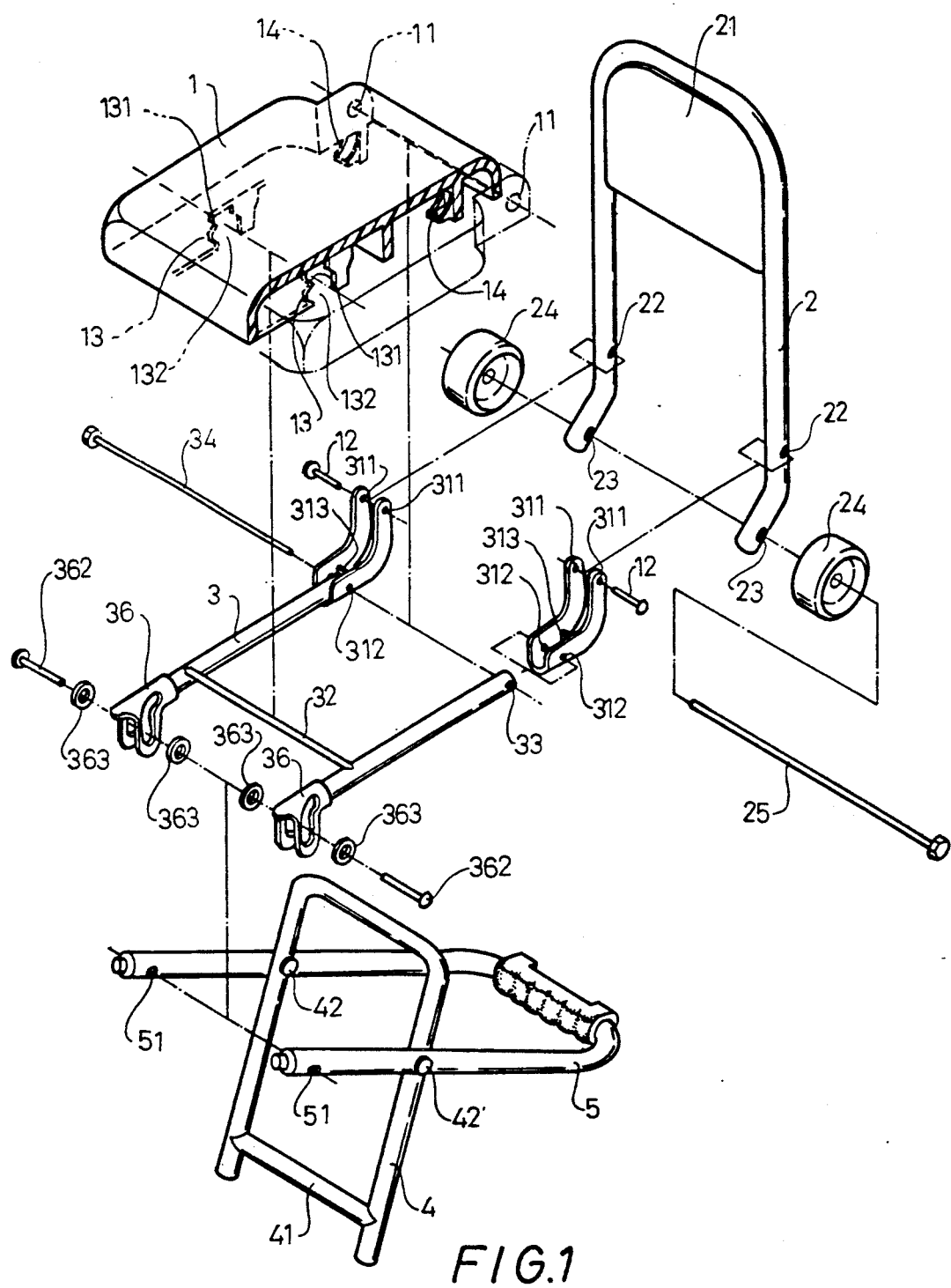
FIG. 1 is an exploded perspective view of the multi-function chair in the present invention.

The multi-function chair in the present invention, as shown in FIG. 1, comprises a seat 1, a back frame 2, a seat frame 3, a fore leg frame 4 and a hind leg frame 5 as its main components.

The seat 1 has two shaft holes 11 in the rear end portion of both opposite sides for two rivets 12 to insert therein to secure the back frame 2 and a brackets 31 with the seat 1, two projecting-down walls 13 at the front portion of both opposite sides, small upper openings 131 communicating with large lower openings 132 formed by the walls 13 for a lateral rod 32 of the seat frame 3 to fit in the small upper hole 131 and for a connecting lateral rod 41 of the fore leg frame 4 to fit in the large lower openings 132 when this chair is transformed into a light duty truck. The seat 1 is also provided with engaging means 14 at the bottom near the rear end for the top of the fore leg frame 4 to engage so that the fore leg frame 4 and the hind leg frame 5 may be formed intercrossing each other at a right angle to support the seat 1 in forming a chair.

The back frame 2 is reversely U-shaped to support a back rest 21 at the upper portion, having two parallel tubes extending down and bored with two shaft holes 22 near the longitudinal centers for rivets 22 to insert therein and two holes 23 at the ends for a shaft rod 25 to pass through combining two casters 24 with the tubes by means of riveting to keep the casters 24 to rotate with the shaft rod 25 as the shaft.

The seat frame 3 has two parallel tubes fixed togehter with a lateral rod 32. The rear ends of the parallel tubes have holes 33 for a shaft rod 34 to pass through to secure two brackets 31 with the seat frame 3 in a riveting way. The two brackets 31 have lower holes 312 for the shaft rod 34 to pass through, two upper holes 311 for pins 12 to pass through to secure the brackets 31 with the back frame 2, and block walls 313 for the back frame to rest on standing upright when the back frame 2 and the brackets 31 are combined together. The front ends of the seat frame 3 are connected with the upper ends of the hind leg frame with joints 36, which have respectively an L-shaped slot 361 for a pin 362 to fit through and move therein, fixed with a nut 363 on the pin 362 which also passes through holes 51 in the hind leg frame 5.

The fore leg frame 4 is reversely U-shaped, having a connecting lateral rod 41 secured between the parallel portion near its two ends, two corners engaging with the engaging means 14 in the seat 1 and two holes near the longitudinal centers for bolts 42 to combine the fore leg frame 4 with the hind leg frame 5 in a movably intercrossing way.

The hind leg frame 5 is U-shaped, having hole 51 at the ends of the parallel portion for pins 362 to pass through and also through the L-shaped slots 361 in the joints 36 so that the pins 362 may move in the slots 361.

Figure 2:
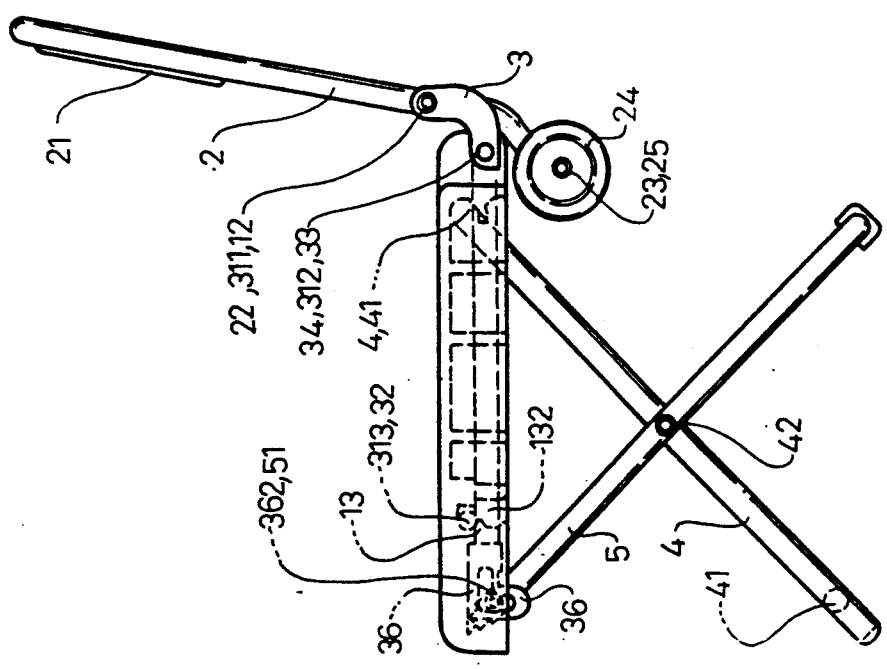
FIG. 2 is a side view of the multi-function chair in the present invention.

FIG. 2 shows this multi-function chair adapted to be used as a chair, wherein the upper openings 131 in the walls 13 engage the lateral rod 32, the back frame 2 is supported in the block walls 313 in the brackets 31, and the hind leg frame 5 has the two tops of the parallel portion supported by the pins 362 positioned in the bending corners of the L-shaped slots 361, as shown in FIG. 2. In this position, the fore leg frame 4 and the hind leg frame 5 are intercrossing at a right angle standing on the ground, capable to endure the weight of a person sitting on this chair.

Figure 3:
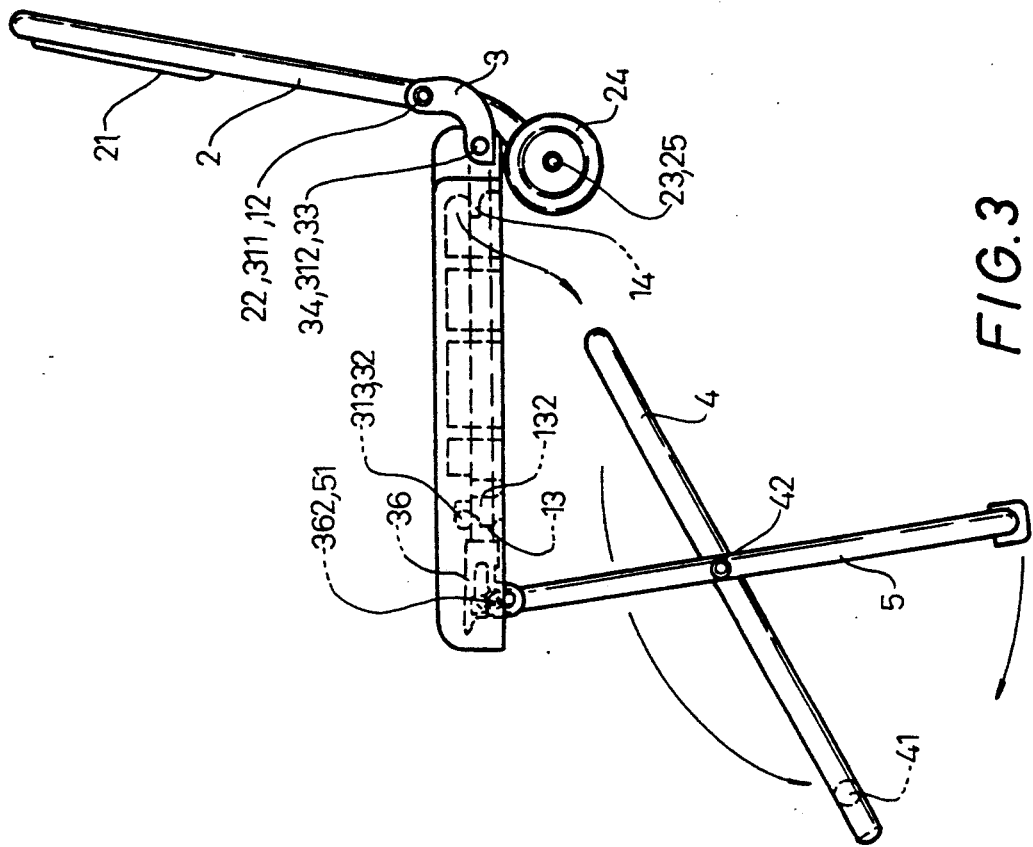
FIG. 3 is a side view of the fore leg separated from the seat frame in the multi-function chair in the present invention.
Figure 4:
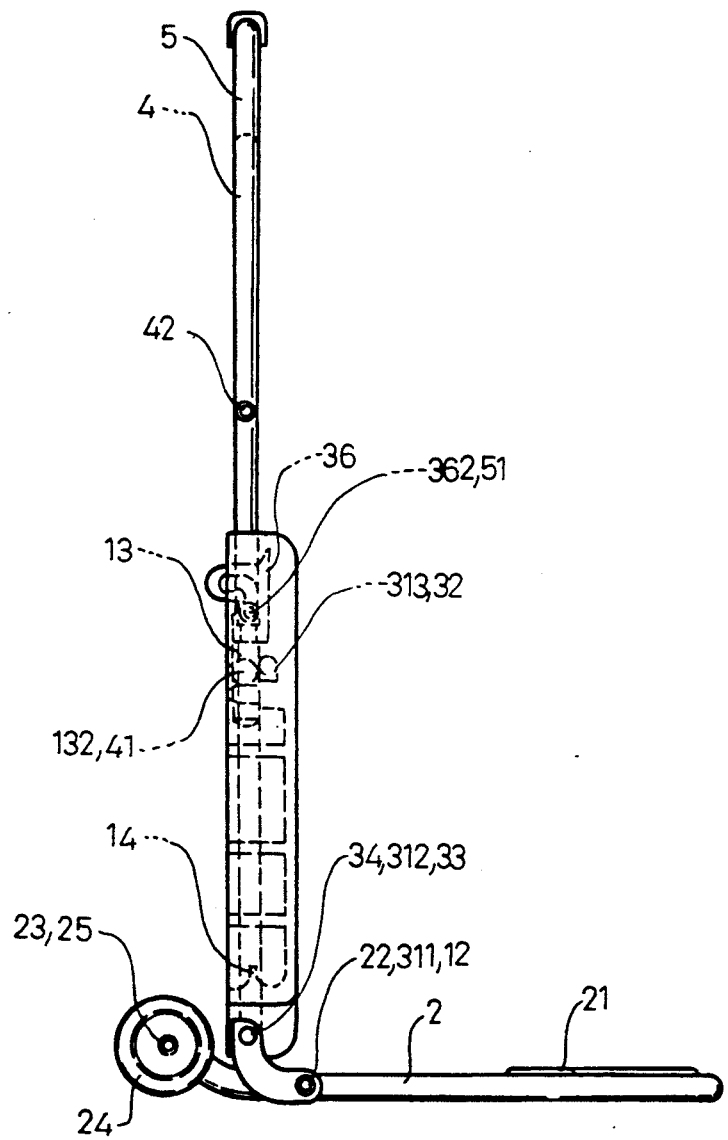
FIG. 4 is a side view of the light duty truck transformed from the chair in the present invention.

FIG. 3 shows this chair in the folding process, wherein the combined portion of the back frame 2 and the seat 1 is lifted up, letting the top of the fore leg frame 4 separate from the engaging means 13 in the seat 1, permitting the fore leg frame 4 and the hind leg frame 5 be folded in a straight line and then be rotatingly pulled to the front of the seat 1. Then the lateral rod 41 of the fore leg frame 4 is made to engage the lower openings 132 of the walls 13 as shown in FIG. 4. Now, the hind leg frame 5 and the seat frame 3 are secured in a straight line without separating from each other, allowing the casters 24 stand and move on the ground, and transforming this invention into a light duty truck.

What is claimed is:

1. A multi-function chair comprising:
   a seat having laterally spaced downwardly projecting walls defining small upper openings and lower large openings communicating with the upper openings, and laterally spaced downwardly projecting engaging means behind said walls;
   a back frame which is U-shaped, having parallel legs extending downward from a joining cross member and shaft holes below the longitudinal center for rivets to pass through to secure said seat with the back frame and said legs having free ends beneath the seat provided with casters;

a seat frame supporting the seat having two parallel rods and a lateral rod secured between the parallel rods near a front end of the seat, an L-shaped bracket fixed at the rear end of each of said parallel rods, said brackets having upper vertical limbs connected to the respective legs of the back frame and lower horizontal limbs connected with the seat frame, a joint fitting fixed to a front end of each of said parallel rods and having an L-shaped slot with a horizontal portion and a vertical portion extending downwardly from the respective rod;

a U-shaped fore leg frame having parallel legs extending from a cross bar and a lateral connecting rod between lower end portions of the legs, the cross bar being adapted to engage the engaging means under the seat;

a U-shaped hind leg frame having parallel legs extending from a cross-bar, the legs of the fore leg frame being pivotally interconnected to the legs of the hind leg frame, the parallel legs of the hind leg frame having free ends with pin connectors securing the legs to said joint fittings for movement along the respective L-shaped slots; and said fore leg frame and said hind leg frame having a first position wherein they intercross each other at a right angle, with the lateral rod of said fore leg frame engaged with said engaging means in said seat, enabling the chair to stand on the ground, said back frame and the rear portion of said seat being liftable to enable said fore leg frame to separate from said engaging means, to move said fore leg frame and said hind leg frame to a straight line configuration whereby, both of said leg frames can be rotated to the front of said seat to engage the lateral rod of said fore leg frame in the lower openings in said walls on said seat, converting the chair into a light duty truck.

2. A chair as claimed in claim 1 wherein said L-shaped brackets have openings through which the legs of the back frame extend.

3. A chair as claimed in claim 1 wherein the cross-bar of the hind leg frame is provided with a hand grip for use when the chair is converted into a truck.

* * * * *